US012420743B2

(12) United States Patent
Smith

(10) Patent No.: US 12,420,743 B2
(45) Date of Patent: Sep. 23, 2025

(54) SYSTEM AND METHOD FOR DYNAMIC LOCALIZATION

(71) Applicants: DENSO International America, Inc., Southfield, MI (US); DENSO CORPORATION, Aichi (JP)

(72) Inventor: Eric J. Smith, Holland, MI (US)

(73) Assignees: DENSO International America, Inc., Southfield, MI (US); DENSO CORPORATION, Kariya (JP)

(*) Notice: Subject to any disclaimer, the term of this patent is extended or adjusted under 35 U.S.C. 154(b) by 0 days.

(21) Appl. No.: 18/439,021

(22) Filed: Feb. 12, 2024

(65) Prior Publication Data

US 2024/0246512 A1   Jul. 25, 2024

Related U.S. Application Data

(63) Continuation of application No. 17/709,771, filed on Mar. 31, 2022, now Pat. No. 11,897,422.

(60) Provisional application No. 63/168,437, filed on Mar. 31, 2021.

(51) Int. Cl.
  B60R 25/24    (2013.01)
  G07C 9/00    (2020.01)
  H01Q 1/32    (2006.01)
  H01Q 21/30   (2006.01)
  H04B 17/318  (2015.01)
  H04W 4/02    (2018.01)
  H04W 4/40    (2018.01)
  H04W 4/80    (2018.01)

(52) U.S. Cl.
  CPC ........ B60R 25/245 (2013.01); G07C 9/00309 (2013.01); H01Q 1/3241 (2013.01); H01Q 21/30 (2013.01); H04B 17/318 (2015.01); H04W 4/023 (2013.01); H04W 4/025 (2013.01); H04W 4/40 (2018.02); H04W 4/80 (2018.02); *B60R 2325/101* (2013.01); *B60R 2325/205* (2013.01); *G07C 2009/00769* (2013.01); *G07C 2209/64* (2013.01)

(58) Field of Classification Search
  CPC .. B60R 25/245; G07C 9/00309; H01Q 21/20; H04B 17/318; H04W 4/023; H04W 4/025
  See application file for complete search history.

(56) References Cited

U.S. PATENT DOCUMENTS

| 11,039,276 B2 | 6/2021 | Smith et al. |
| 11,122,389 B2 | 9/2021 | Smith et al. |
| 2012/0244877 A1 | 9/2012 | Margalef et al. |
| 2018/0099643 A1 | 4/2018 | Golsch et al. |
| 2021/0392461 A1 | 12/2021 | Cooper et al. |
| 2022/0314934 A1 | 10/2022 | Smith |

*Primary Examiner* — Vernal U Brown
(74) *Attorney, Agent, or Firm* — Warner Norcross + Judd LLP

(57) ABSTRACT

A system and method are provided for determining a location of a portable device relative to an object. The system and method may include operating in two modes: 1) a first mode in which an antenna output, such as a received signal strength indicator, satisfies a mode transition criterion that is dynamic, and 2) a second mode in which, with the mode transition criterion being satisfied, the location of the portable device is determined.

20 Claims, 6 Drawing Sheets

| BASE METERS | BASE (RSSI) | UWB (COMPUTED DISTANCE) | DEVICE (MEASURED RSSI) | VARIABLE OFFSET MS - BS |
|---|---|---|---|---|
| 0 | -45 | 0 | -51 | -6 |
| 1 | -51 | 1 | -57 | -6 |
| 2 | -57 | 2 | -63 | -6 |
| 4 | -63 | 4 | -69 | -6 |
| 8 | -69 | 8 | -75 | -6 |
| 16 | -75 | 16 | -81 | -6 |

BASELINE RSSI VS. DISTANCE    MEASURED DISTANCE VS. MEASURED RSSI AND VARIABLE OFFSET DETERMINATION

630 — DYNAMIC CRITERION:
MEASURED RSSI - VARIABLE OFFSET < THRESHOLD BASE RSSI

THRESHOLD DISTANCE, 640
CALIBRATION MEASUREMENT, 620

BASELINE RSSI AND CALIBRATED RSSI VS. DISTANCE

SYSTEM AND METHOD FOR DYNAMIC LOCALIZATION

FIELD OF THE INVENTION

The present application relates to a system and method for determining location information with respect to a portable device and an object, such as a vehicle.

BACKGROUND

Real-time location or position determinations for objects have become increasingly prevalent across a wide spectrum of applications. Real-time locating systems (RTLS) are used and relied on for tracking objects, such as smartphones, in many realms including, for example, automotive, storage, retail, security access for authentication, and security access for authorization.

One conventional RTLS in the automotive realm includes a transceiver or master controller located within a vehicle and capable of communicating via radio frequency (RF) with a smartphone. One or more aspects of the communications between the master controller and the smartphone, such as signal strength of the communications, may be monitored and used as a basis for determining a location of the smartphone relative to the vehicle. For instance, if the signal strength of communications is low, the smartphone may be farther away from the vehicle relative to communications where the signal strength is high. In general, the strength of communications drops off as the distance increases between the smartphone and the vehicle. Based on this or other measurements of a signal characteristic of communications, a location of the smartphone may be determined.

SUMMARY

A system and method are provided for determining a location of a portable device relative to an object. The system and method may include operating in two modes: 1) a first mode in which an antenna output, such as a received signal strength indicator, satisfies a mode transition criterion that is dynamic, and 2) a second mode in which, with the mode transition criterion being satisfied, the location of the portable device is determined.

In one embodiment, a system for establishing a location with respect to a portable device and an object is provided. The system may include a plurality of antennas, each of the plurality of antennas configured to receive wireless communications and provide one or more antenna outputs corresponding to wireless communications. The system may include a controller capable of directing communications between a fixed position device and the portable device, where the controller is operable to direct a locator to determine the location of the portable device with respect to the object based on one or more first antenna outputs of the plurality of antenna outputs. The controller may be configured, in response to one or more second antenna outputs of the plurality of antenna outputs satisfying a mode transition criterion, to direct the locator to determine the location of the portable device based on the one or more first antenna outputs, wherein the mode transition criterion is variable.

In one embodiment, the one or more first antenna outputs and/or the one or more second antenna outputs may correspond to a signal characteristic of communications, such as a received signal strength, a time of arrival, an angle of arrival, and a time of flight.

In one embodiment, a method of determining a location of a portable device with respect to an object is provided. The method may include receiving first wireless communications in a first antenna, and providing a first antenna output based on the first wireless communications. The method may involve varying a mode transition criterion based on the first antenna output.

In one embodiment, the method may include receiving second wireless communications in a second antenna, providing a second antenna output based on the second wireless communications, and determining if the second antenna output satisfies the mode transition criterion. Based on a determination that the second antenna output satisfies the mode transition criterion, the location of the portable device may be determined with respect to the object based on wireless communications.

In one embodiment, a system is provided for determining a location of a portable device with respect to an object. The system may include a plurality of antennas, each of the plurality of antennas configured to receive wireless communications and provide one or more antenna outputs corresponding to wireless communications. The system may also include a control system operable to transition from a first locator mode to a second locator mode based on a first antenna output of the plurality of antenna outputs.

The control system, in one embodiment, may be configured to vary a mode transition criterion based on a second antenna output of the plurality of antenna outputs, where the control system is operable to transition from the first locator mode to the second locator mode based on the first antenna output satisfying the mode transition criterion.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION

Figure 1:
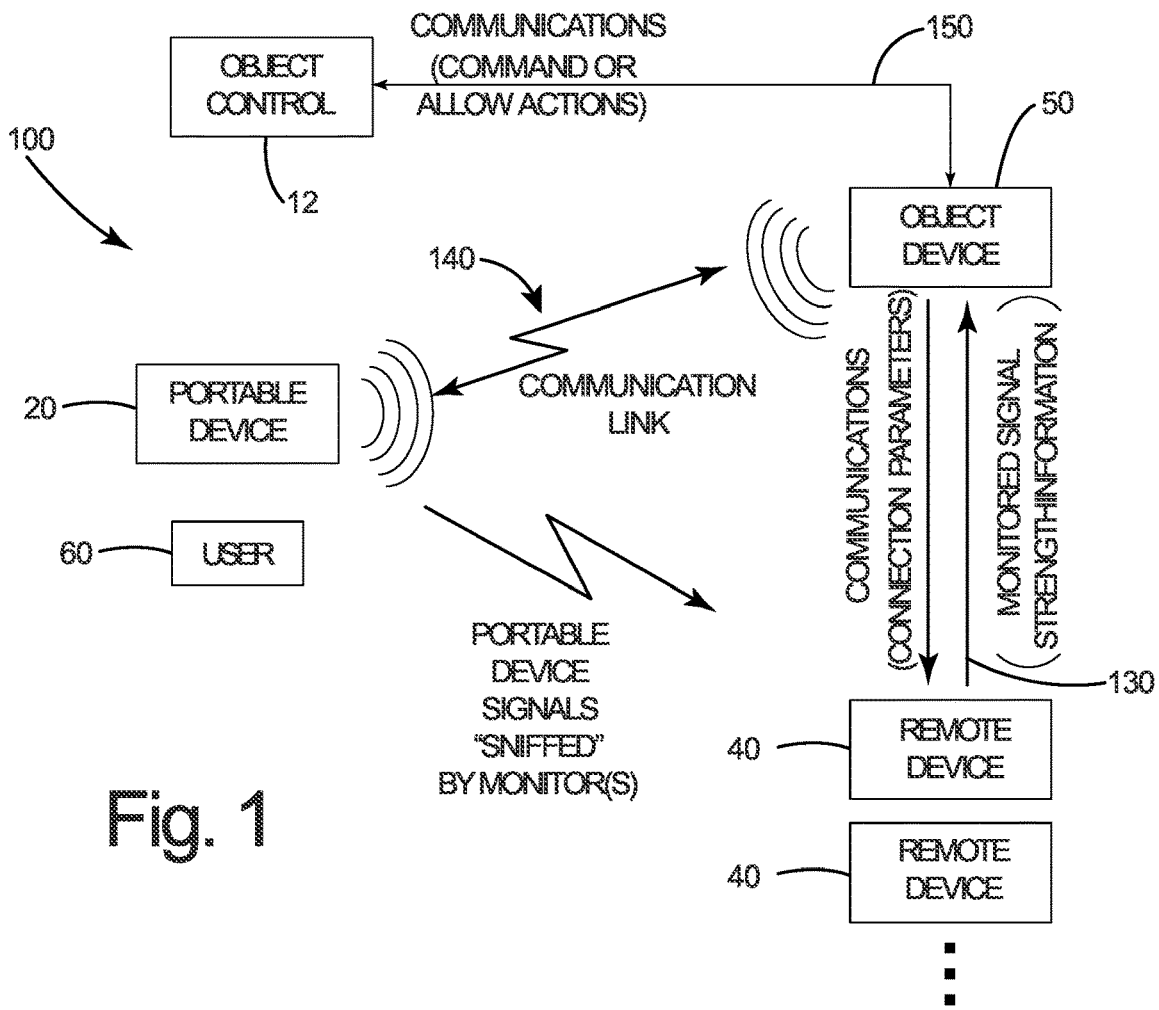
FIG. 1 shows a representative view of a system in accordance with one embodiment.

A system and method for determining a location of a portable device relative to an object is provided. The system and method may include operating in two modes: 1) a first mode in which an antenna output, such as a received signal strength indicator, satisfies a mode transition criterion that is dynamic, and 2) a second mode in which, with the mode transition criterion being satisfied, the location of the portable device is determined.

To provide an example, in one embodiment, the system may be operable to determine a location of a portable device based on first and second methodologies. The first methodology may be more accurate than the second methodology; however, the first methodology may have one or more disadvantages relative to the second methodology, such as increased power consumption or a slower update rate. Location information, such as distance between the object and the portable device, may be determined via the first methodology, and this location information may form the basis for dynamically calibrating location information determined via the second methodology.

In one embodiment, the location information determined via the first methodology may form the basis for adapting a mode transition criterion applied to an output of the second methodology. If the mode transition criterion is satisfied by the second methodology output, the first methodology may be used to determine a location of the portable device. This way, advantages of the second methodology may be realized in a first mode in which the mode transition criterion is not met, and the advantages of the first methodology may be realized in a second mode after the mode transition criterion is satisfied.

In one embodiment, the first methodology may include determining location information based on Ultra-Wide Band (UWB) communications, and the second methodology may include determining location information based on Bluetooth Low Energy (BTLE) communications. The UWB communications may facilitate obtaining location information, but may be operable to update the location information at a slower rate than possible with BTLE communications. On the other hand, the BTLE communications may be less accurate for determining location information than UWB communications. Location information based on the UWB communications may be provided as a basis for varying the mode transition criterion, which is applied to an output corresponding to the BTLE communications, such that the BTLE communications may be used for determining location information prior to the mode transition criterion being satisfied. After the mode transition criterion is satisfied, the UWB communications may be used for determining location information with respect to the portable device and the object. Aspects of a location methodology based on BTLE communications can be calibrated against a location methodology based on UWB communications, allowing, for instance, BTLE communications to be used as a basis for a location determination when the portable device is relatively far away, and UWB communications to be used as a basis for a location determination after the BTLE communications, calibrated by the UWB communications, are indicative of the portable device being within a threshold distance with respect to the object. In one embodiment, a first output (e.g., signal strength) based on the BTLE communications may be compared against location information obtained based on UWB communications. Based on this comparison, the mode transition criterion may be varied. A second output (e.g., signal strength) based on the BTLE communications may be processed to determine if the second output mode satisfies the transition criterion. This determination of the processing outputs (e.g., signal strength measurements) based on the BTLE communications may be conducted many times during a period of time during which there is no determination of location information based on the UWB communications. If the output based on the BTLE communications satisfies the mode transition criterion, such as the signal strength being stronger than a threshold signal strength value calibrated in accordance with the location information obtained based on UWB communications, the system may transition to a mode in which the location information is determined repeatedly based on UWB communications. As another example, the mode transition criterion may related to a distance threshold, such that if a computed distance is less than a distance threshold, the system may transition to another mode.

For purposes of disclosure, one or more examples described herein include determining location according to a first methodology that involves UWB communications, and a second methodology that involves BTLE communications. The first methodology may involve one or more alternative or additional types of communications, such as BTLE, WiFi, or BLE channel sounding (high accuracy distance measurements) (CS/HADM), and the second methodology may involve one or more alternative or additional types of communications, such as UWB, WiFi, and BLE CS/HADM. BTLE may be utilized as a threshold or BTLE may be utilized to yield a determined position or distance. In other words, if the system is sniffing, the system may be configured for a full BLE RSSI based zone determination or distance instead of a single threshold.

I. System Overview

Figure 2:
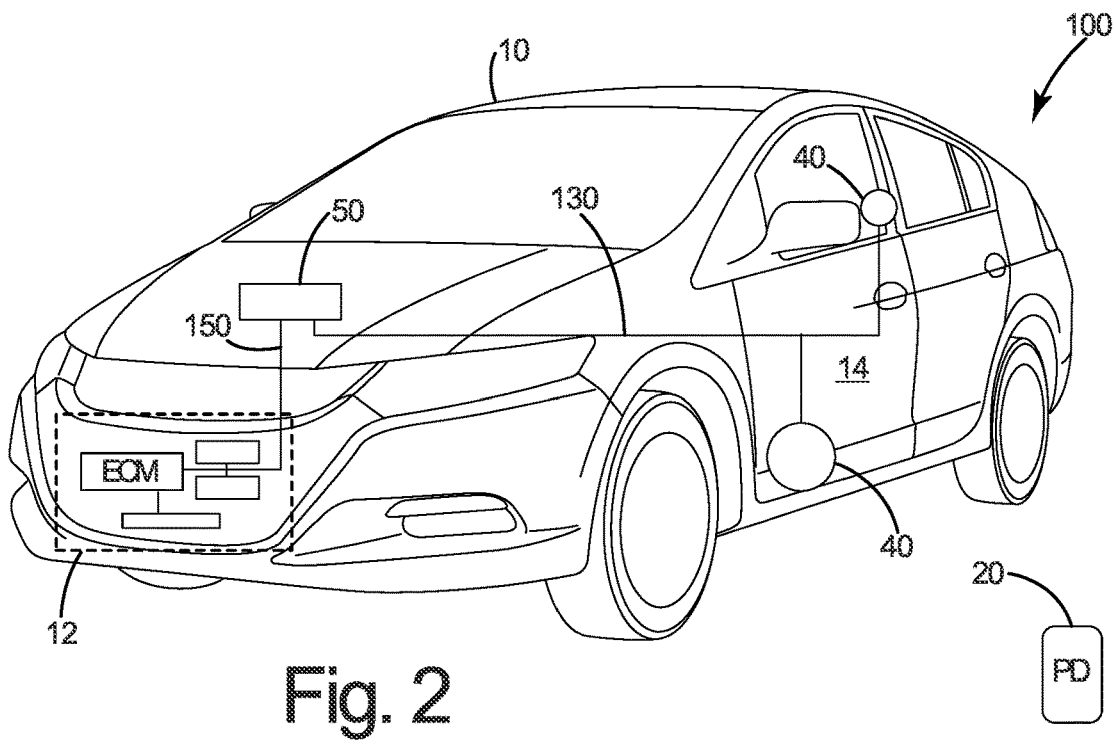
FIG. 2 shows an object in conjunction with the system of FIG. 1.

A system in accordance with one embodiment is shown in the illustrated embodiment of FIGS. 1 and 2 and generally designated 100. The system 100 may include one or more system components as outlined herein. A system component may be a user 60 or an electronic system component, which may be the portable device 20 (e.g., a portable device), a remote device 40, or an object device 50, or a component including one or more aspects of these devices. The underlying components of the object device 50, as discussed herein, may be configured to operate in conjunction with any one or more of these devices. In this sense, in one embodiment, there may be several aspects or features common among the portable device 20, the remote device 40, and the object device 50. The features described in connection with the object device 50 depicted in FIG. 3 may be incorporated into the portable device 20 or the remote device 40, or both. In one embodiment, the object device 50 may form an equipment component disposed on an object 10, such as a vehicle or a building. The object device 50 may be communicatively coupled to one or more systems of the object 10 to control operation of the object 10, to transmit information to the one or more systems of the object 10, or to receive information from the one or more systems of the object 10, or a combination thereof. For instance, the object 10 may include an object controller 12 configured to control operation of the object 10. The object 10 may include one or more communication networks, wired or wireless, that facilitate communication between the object controller 12 and the object device 50. The communication network for facilitating communications between the object device 50 and the object controller 12 is designated 150 in the illustrated embodiment of FIG. 2 and provided as a CAN bus; however, it is to be understood that the communication network is not so limited. The communication network may be any type of network, including a wired or wireless network, or a combination of two or more types of networks.

Figure 3:
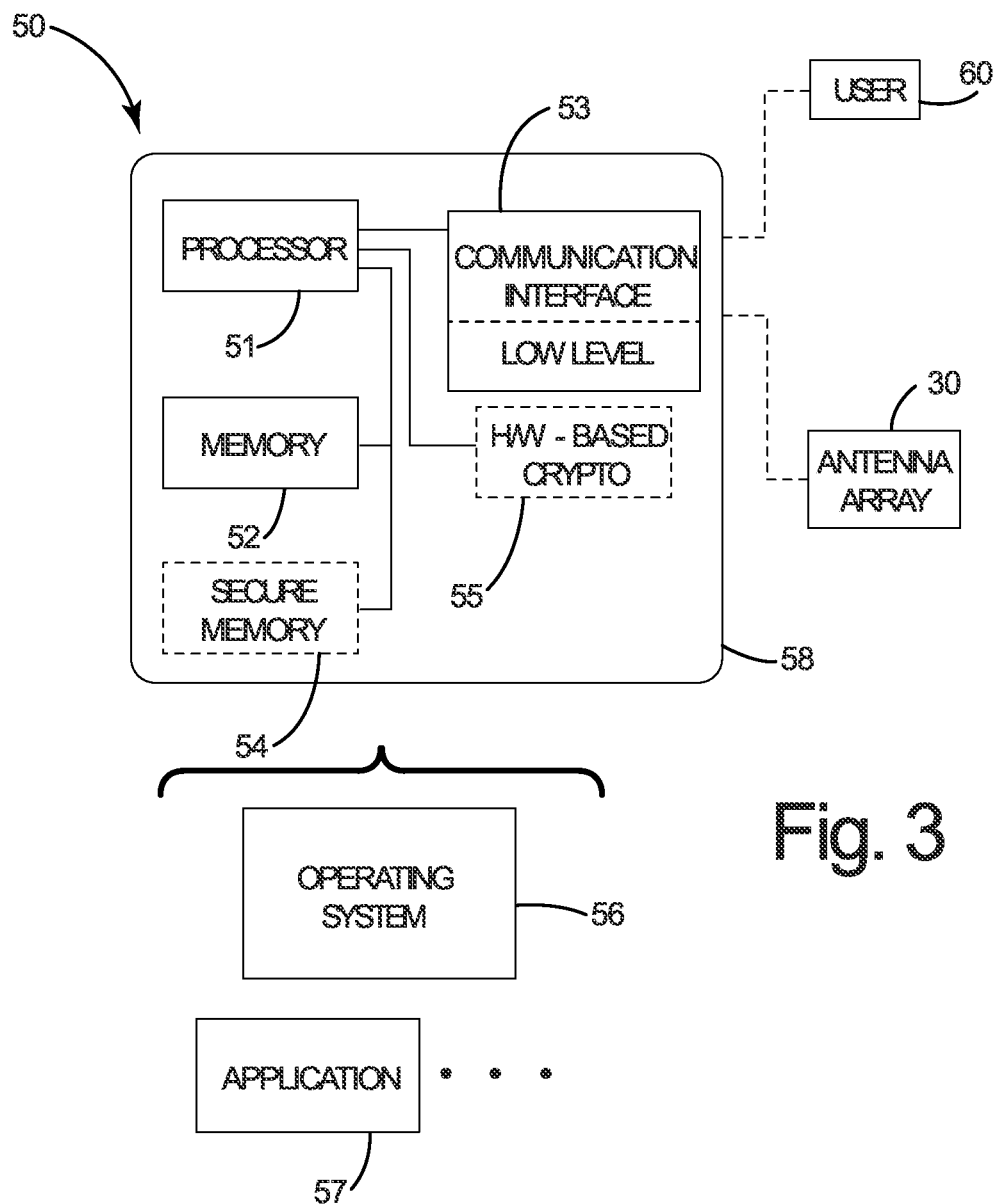
FIG. 3 shows a system component in accordance with one embodiment.

In the illustrated embodiment of FIG. 3, the object device 50 may include a control system or controller 58 configured to control operation of the object device 50 in accordance with the one or more functions and algorithms discussed herein, or aspects thereof. The system components, such as the portable device 20 or the remote device 40, or both, may similarly include a controller 58.

The controller 58 includes electrical circuitry and components to carry out the functions and algorithms described herein. Generally speaking, the controller 58 may include one or more microcontrollers, microprocessors, and/or other programmable electronics that are programmed to carry out the functions described herein. The controller 58 may additionally or alternatively include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the object device 50, or they may reside in a common location within the object device 50. When physically distributed, the components may communicate using any suitable serial or parallel communication protocol, such as, but not limited to, CAN, LIN, Vehicle Area Network (VAN), FireWire, I2C, RS-232, RS-485, and Universal Serial Bus (USB).

As described herein, the terms locator, module, model, and generator designate parts of the controller 58. For instance, a model or locator in one embodiment is described as having one or more core functions and one or more parameters that affect output of the one or more core functions. Aspects of the model or locator may be stored in memory of the controller 58, and may also form part of the controller configuration such that the model is part of the controller 58 that is configured to operate to receive and translate one or more inputs and to output one or more outputs. Likewise, a module or a generator are parts of the controller 58 such that the controller 58 is configured to receive an input described in conjunction with a module or generator and provide an output corresponding to an algorithm associated with the module or generator.

The controller 58 of the object device 50 in the illustrated embodiment of FIG. 3 may include one or more processors 51 that execute one or more applications 57 (software and/or includes firmware), one or more memory units 52 (e.g., RAM and/or ROM), and one or more communication interfaces 53, amongst other electronic hardware. The object device 50 may or may not have an operating system 56 that controls access to lower-level devices/electronics via a communication interface 53. The object device 50 may or may not have hardware-based cryptography units 55—in their absence, cryptographic functions may be performed in software. The object device 50 may or may not have (or have access to) one or more secure memory units 54 (e.g., a secure element or a hardware security module (HSM)). Optional components and communication paths are shown in phantom lines in the illustrated embodiment.

The controller 58 in the illustrated embodiment of FIG. 3 is not dependent upon the presence of a secure memory unit 54 in any component. In the optional absence of a secure memory unit 54, data that may otherwise be stored in the secure memory unit 54 (e.g., private and/or secret keys) may be encrypted at rest. Both software-based and hardware-based mitigations may be utilized to substantially prevent access to such data, as well as substantially prevent or detect, or both, overall system component compromise. Examples of such mitigation features include implementing physical obstructions or shields, disabling JTAG and other ports, hardening software interfaces to eliminate attack vectors, using trusted execution environments (e.g., hardware or software, or both), and detecting operating system root access or compromise.

For purposes of disclosure, being secure is generally considered being confidential (encrypted), authenticated, and integrity-verified. It should be understood, however, that the present disclosure is not so limited, and that the term "secure" may be a subset of these aspects or may include additional aspects related to data security.

The communication interface 53 may be any type of communication link, including any of the types of communication links describe herein, including wired or wireless. The communication interface 53 may facilitate external or internal, or both, communications. For instance, the communication interface 53 may be coupled to or incorporate the antenna array 30. The antenna array 30 may include one or more antennas configured to facilitate wireless communications, including BTLE communications.

As another example, the communication interface 53 may provide a wireless communication link with another system component in the form of the portable device 20, such as wireless communications according to the WiFi standard. In another example, the communication interface 53 may be configured to communicate with an object controller 12 of a vehicle (e.g., a vehicle component) via a wired link such as a CAN-based wired network that facilitates communication between a plurality of devices. The communication interface 53 in one embodiment may include a display and/or input interface for communicating information to and/or receiving information from the user 60.

In one embodiment, the object device 50 may be configured to communicate with one or more auxiliary devices other than another object device 50 or a user. The auxiliary device may be configured differently from the object device 50—e.g., the auxiliary device may not include a processor 51, and instead, may include at least one direct connection and/or a communication interface for transmission or receipt, or both, of information with the object device 50. For instance, the auxiliary device may be a solenoid that accepts an input from the object device 50, or the auxiliary device may be a sensor (e.g., a proximity sensor) that provides analog and/or digital feedback to the object device 50.

The system 100 in the illustrated embodiment may be configured to determine location information in real-time with respect to the portable device 20. In the illustrated embodiments of FIGS. 1 and 2, the user 60 may carry the portable device 20 (e.g., portable device such as a smartphone). The system 100 may facilitate locating the portable device 20 with respect to the object 10 (e.g., a vehicle) in real-time with sufficient precision to determine whether the user 60 is located at a position at which access to the object 10 or permission for an object command should be granted.

For instance, in an embodiment where the object 10 is a vehicle, the system 100 may facilitate determining whether the portable device 20 is outside the vehicle but in close proximity, such as within 5 feet, 3 feet, or 2 feet or less, to the driver-side door 14. This determination may form the basis for identifying whether the system 100 should unlock the vehicle. On the other hand, if the system 100 determines the portable device 20 is outside the vehicle and not in close proximity to the driver-side door (e.g., outside the range of 2 feet, 3 feet, or 5 feet), the system 100 may determine to lock the driver-side door. As another example, if the system 100 determines the portable device 20 is in close proximity to the driver-side seat but not in proximity to the passenger seat or the rear seat, the system 100 may determine to enable mobilization of the vehicle. Conversely, if the portable device 20 is determined to be outside close proximity to the driver-side seat, the system 100 may determine to immobilize or maintain immobilization of the vehicle. It is to be understood that the object 10 may be any type of object and is not limited to a vehicle. For instance, the object 10 may be a point-of-sale terminal, a door, a turnstile, another type of vehicle, such as a train, bus, airplane, or ship. Additionally, or alternatively, the object 10 may correspond to an individual location or seat within another object.

The object 10 may include multiple object devices 50 or variant thereof, such as an object device 50 including a remote device 40 coupled to an antenna array 30, in accordance with one or more embodiments described herein.

Micro-location of the portable device 20 may be determined in a variety of ways, such as using information obtained from a global positioning system, one or more signal characteristics of communications from the portable device 20, and one or more sensors (e.g., a proximity sensor, a limit switch, or a visual sensor), or a combination thereof. An example of micro-location techniques for which the system 100 can be configured are disclosed in U.S. Non-provisional patent application Ser. No. 15/488,136 to Raymond Michael Stitt et al., entitled SYSTEM AND METHOD FOR ESTABLISHING REAL-TIME LOCATION, filed Apr. 14, 2017—the disclosure of which is hereby incorporated by reference in its entirety.

In one embodiment, in the illustrated embodiment of FIGS. 1-3, the object device 50 (e.g., a system control module (SCM)) and a plurality of remote devices 40 (coupled to an antenna array 30) may be disposed on or in a fixed position relative to the object 10. Example use cases of the object 10 include the vehicle identified in the prior example, or a building for which access is controlled by the object device 50.

The portable device 20 may communicate wirelessly with the object device 50 via a communication link 140. The plurality of remote devices 40 may be configured to sniff the communications of the communication link 140 between the portable device 20 and the object device 50 to determine one or more signal characteristics of the communications, such as signal strength, angle of arrival, time of flight, or any combination thereof. The determined signal characteristics may be communicated or analyzed and then communicated to the object device 50 via a communication link 130 separate from the communication link 140 between the portable devices 20 and the object device 50.

Additionally, or alternatively, the portable device 20 may establish a direct communication link with one or more of the remote devices 40, and the one or more signal characteristics may be determined based on this direct communication link.

Figure 8:
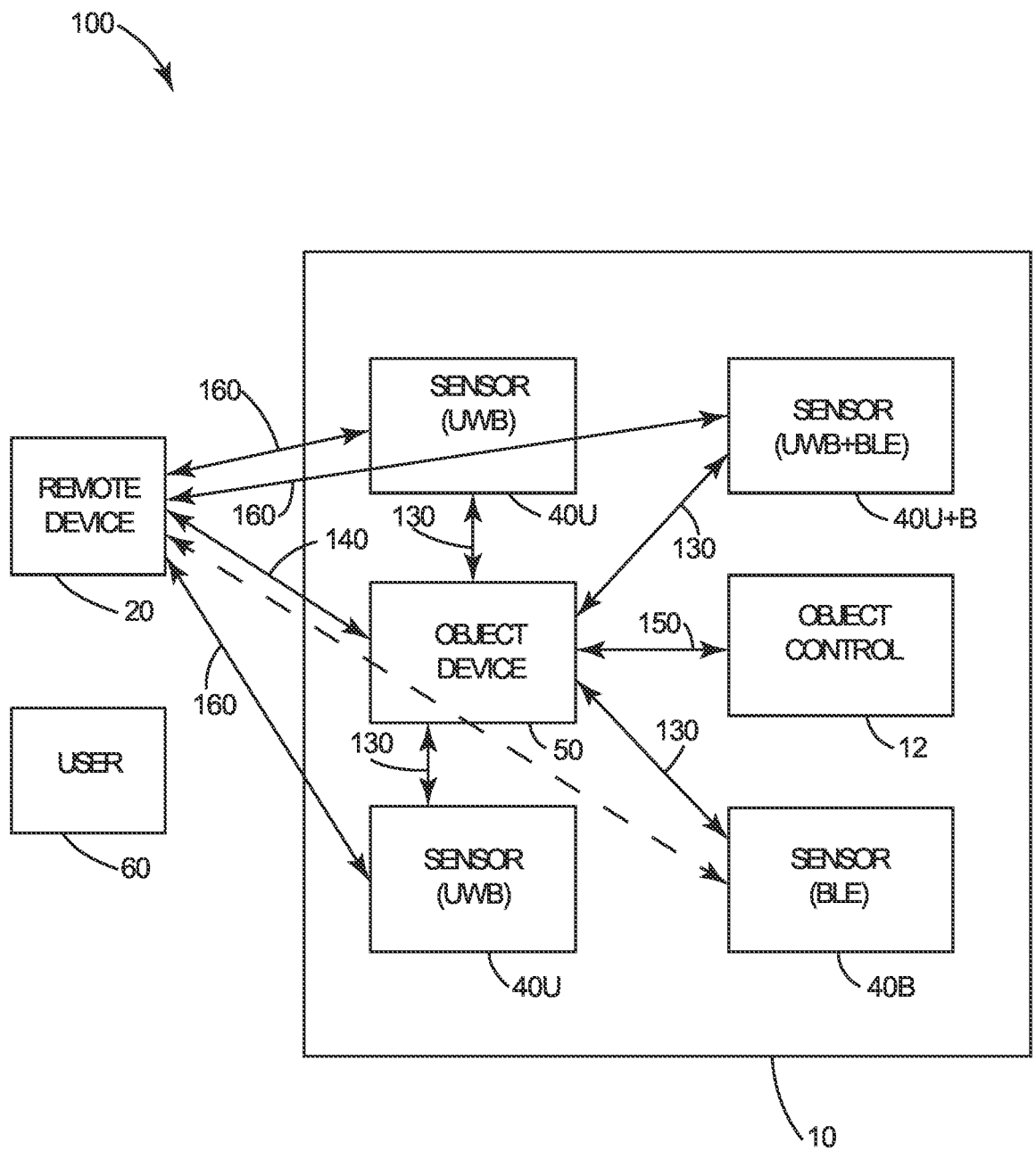
FIG. 8 shows a representative view of a system in accordance with one embodiment.

For instance, an alternative configuration of the system 100 is shown in the illustrated embodiment of FIG. 8. The system 100 may include a portable device 20, a user 60, and an object 10, similar to the system described in conjunction with FIG. 1. The object 10 in accordance with one embodiment may include an object device 50, an object controller 12, and a plurality of sensors, which may be similar to the remote devices 40 described herein.

In the illustrated embodiment, the portable device 20 may include both Ultra Wide Band (UWB) and BTLE communication capabilities. For instance, the portable device 20 may be in the form of a smartphone with both UWB and BTLE radios. The communication link 140 may include one or more types of communications (including various communication protocols) based on communication capabilities of the portable device 20. For instance, the communication link 140 may be established in accordance with UWB communications and BTLE communications, simultaneously or at different times. Additionally, or alternatively, BTLE and BTLE CS/HADM may be provided in one or more devices of the system 100 (e.g., a portable device 20 or a remote device 40) on the same or different transceiver(s), using the same or different antenna(s).

The system 100 in the illustrated embodiment of FIG. 8 may include one or more remote devices 40 (which may also be described as anchors) that are disposed on the object 10. The one or more remote devices 40 may be disposed in a variety of positions on the object 10, such as the positions described herein, including for instance, one or more remote devices 40 (e.g., sensors) in the door panel and one or more other remote devices 40 (e.g., sensors) in the B pillar, as shown and described in connection with FIG. 2.

One or more of the remote devices 40 may be operable to communicate via at least one communication link according to a communication protocol. The communication link may be established via one or more channels. As described in connection with FIG. 2, the remote device 40 may be operable to communicate by sniffing or receiving communications via a at least one communication link 140 established between the object device 50 and the portable device 20, such that the remote device 40 does not transmit communications via the communication link 140. This type of communications for the remote device 40 is shown as a phantom line in FIG. 8.

However, one or more remote devices 40 in the system 100 of FIG. 8 may be operable to communicate by transmitting and receiving communications via at least one communication link 160 established directly with the portable device 20. In this way, the remote device 40 may directly communicate with the portable device 20. The at least one communication link 160 may include communications according to more than one protocol (e.g., BTLE and UWB).

The one or more remote devices 40 of the system 100 in the illustrated embodiment of FIG. 8 may be operable to a) sniff communications with respect to the communication link 140 between the portable device 20 and the object device 50, or b) directly communicate with the portable device 20 via the at least one communication link 160. The communication capabilities of the one or more remote devices 40 in the illustrated embodiment is identified in the figure and by a letter designation U for UWB and B or BTLE. For example, the remote devices 40U is an ultra-wideband anchor responsive to UWB signals; a remote device 40U+B is responsive to both UWB and BTLE communications; and a remote device 40B is a BTLE anchor.

In one embodiment, a remote device 40 may communicate directly with the portable device 20, while optionally maintaining a connection to a control module of the object device 50). Communications with the portable device 20 and the object device 50 may be within the same connection (e.g., BTLE), but at different times and/or frequencies per that communications and/or ranging protocol.

It is to be understood that an object 10, such as a vehicle, may include more remote devices 40 than shown in the illustrated embodiment of FIG. 8. Depending on the implementation, some number of anchors may be integrated in a vehicle. For instance, 3 to 10 anchors with both UWB and BTLE capabilities may be provided.

In one embodiment, UWB, similar to BTLE, is a standardized communication protocol (see IEEE 802.15.4a/z). One way in which UWB may differ from BTLE is with respect to ranging applications. UWB may involve transmitting short duration pulses that allow for time-of-flight functions to be used to determine the range from the portable device 20 to one or more remote devices 40U, 40U+B (e.g., anchors). Then the object device 50 may use a lateration function and/or a multilateration function to determine localization with respect to the portable device 20 (e.g., the location of the portable device 20 relative to the object 10). Lateration and/or multilateration may involve processing a set of ranges from the portable device 20 to each remote device 40 to output a position estimate of the portable device 20 relative to the object 10). The portable device 20 and the UWB-enabled remote devices 40U, 40UB may transmit and receive packets of data back-and-forth, enabling a time-of-flight determination with respect to such communications.

The system 100 in the illustrated embodiment of FIG. 8 may include at least two different communication links for determining localization. For instance, the communication link 140 may utilize BTLE-based localization, and the communication link 160 may utilize UWB-based localization. In the illustrated embodiment, the communication link 160 is designated with respect to each of remote devices 40U, 40U+B; however, it is to be understood that each of these communication links 160 may not be the same. For instance, each of the communication links 160 may be separate (e.g., a separate channel or band).

Utilizing multiple communication links for localization may provide a number of benefits.

For instance, in a configuration in which both BTLE and UWB information are obtained, this information can be combined to enhance and stabilize a localization estimate. The BTLE and UWB channels used in the localization may involve different frequencies, and the signal characteristics to be exploited for ranging are different (RSSI for BTLE and time-of-flight for UWB).

RSSI ranging calibration may be augmented or supplemented with time-of-flight from UWB communications. This augmentation or supplemental use of time-of-flight may be conducted in real-time by the system 100, or conducted in a manner to adapt a model that uses sensed information not based on UWB communications (e.g., only sensed information with respect to BTLE communications).

For instance, one embodiment according to the present disclosure may be directed toward calibrating out variance of RSSI or range calculations. BTLE+UWB capable portable devices 20 may be tested to build up a map of BTLE communication characteristics, UWB communication characteristics, and ranging or localization data. A BTLE-only portable device 20 may be operable to process such maps but without UWB communications characteristics to refine RSSI-only range estimates. For instance, the locator 210 may be based on both BTLE+UWB communication characteristics, and an adapted form of the locator 210 may be based on BTLE communication characteristics without the UWB communication characteristics. Alternatively, the locator 210 may be based on BTLE communication characteristics, and the adapted form of the locator 210 may be based on both UWB and BTLE communication characteristics. It is to be understood that BTLE or UWB, or both, may be replaced with another type of communication protocol.

The portable device 20, in one embodiment, can establish a direct communication link 160 with one or more of the remote devices 40U, 40U+B, and the one or more signal characteristics (e.g., time-of-flight) may be determined based on this direct communication link 160.

As described herein, one or more signal characteristics, such as signal strength and angle of arrival, may be analyzed to determine location information about the portable device 20 relative to the object 10, an aspect of the object 10, or the object device 50, or a combination thereof. For instance, time difference of arrival or the angle of arrival, or both, among the remote devices 40 and the object device 50 may be processed to determine a relative position of the portable device 20. The positions of the one or more antenna arrays 30 relative to the object device 50 may be known so that the relative position of the portable device 20 can be translated to an absolute position with respect to the antenna arrays 30 and the object device 50.

Additional or alternative examples of signal characteristics may be obtained to facilitate determining position according to one or more algorithms, including a distance function, trilateration function, a triangulation function, a lateration function, a multilateration function, a fingerprinting function, a differential function, a time of flight function, a time of arrival function, a time difference of arrival function, an angle of departure function, a geometric function, etc., or any combination thereof.

II. Locator

Figure 4:
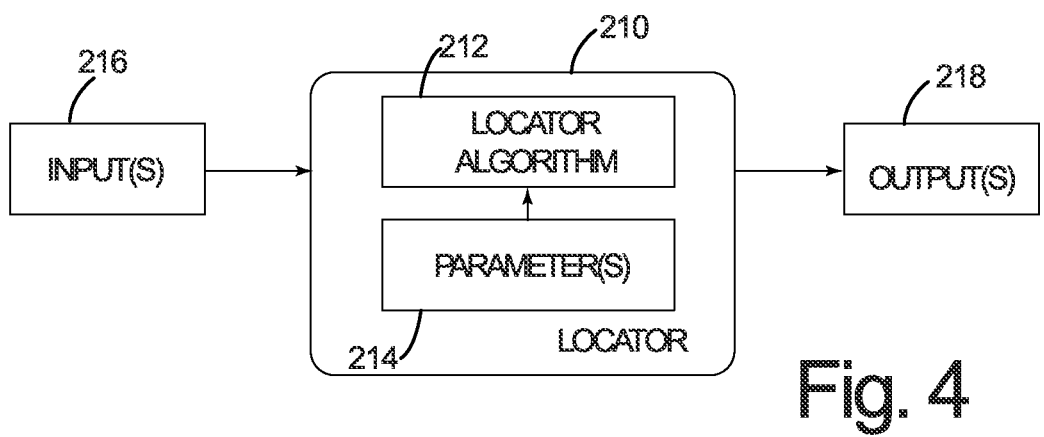
FIG. 4 shows a locator of the system in accordance with one embodiment.

The system 100 in the illustrated embodiment of FIGS. 1-8 may be configured to determine location information about the portable device 20 relative to the object 10. The location information may be indicative of an exterior location of the portable device 20 relative to the object 10, or the location information may be indicative of an interior location of the portable device 20 within the object 10, or a combination thereof. In one embodiment, a locator may be configured to determine this location information. A locator in accordance with one embodiment is depicted in FIG. 4 and generally designated 210. The locator 210 may be configured to receive one or more inputs 216, such as one or more signal characteristics of wireless communications transmitted by the portable device 20 and received by one or more remote devices 40. The inputs may be translated to one or more outputs 218 corresponding to the location information.

The location information may take variety of forms. Examples types of location information include distance (such as a polar coordinate [distance+angle], a cartesian coordinate [x,y or x,y,z] distance), a computed signal strength, a relative distance (far, near, etc.), environmental indicator (e.g., reflectivity), a zone, and a quality metric, and one or more of these items with confidence levels, or any combination thereof.

An input 216, in one embodiment, may be based on outputs from multiple antennas (on the same or different devices in the system). For instance, the input 216 may be a function of the outputs from multiple antennas.

In one embodiment, multiple inputs 216 may be provided to the locator 210. The multiple inputs may each be based on one or more outputs from multiple antennas. Some or all of the multiple inputs 216 may be aligned in time. Some or all of the multiple inputs 216 may correspond to different points in time. In one embodiment, inputs 216 that are aligned in time may be based on communication sniffed by one or more remote devices 40. Additionally, or alternatively, at least one input 216 of inputs 216 that are not aligned in time may be based on aspects that are not sniffed.

It should be understood that the inputs 216 are not limited to signal characteristics of wireless communications. The inputs 216 may include one or more measurements of characteristics or parameters other than wireless communications, such as an object state (e.g., a door is open) or a previous location or zone determination, or any combination thereof. Additionally, or alternatively, the inputs 216 may be indicative of a state of the object 10 or another device in the system 100. For instance, in the context of a vehicle, one or more of the inputs 216 may indicate that one or more of the vehicle doors are open or closed, or whether a window is open or closed.

The locator 210 in the illustrated embodiment may be incorporated into the object device 50. For instance, the controller 58 of the object device 50 may incorporate the locator 210, and be communicatively coupled to one or more of the remote devices 40 via the communication interface 53. The locator 210 may include a core function or locator algorithm 212 that is configured to receive the one or more inputs 216 and to generate the one or more outputs 218 indicative of a location of the portable device 20 relative to the object 10. As discussed herein, the one or more inputs 216 may vary from application to application. Examples of inputs 216 include one or more signal characteristics of the communications, such as signal strength (RSSI), angle of arrival (AOA), time of flight (TOF), IQ, phase, phase-based distance, time of arrival, impulse response, HADM based ranging, angle of departure (AOD), round-trip-timing, a quality metric, a first path (or other) power characteristic (e.g., with respect to UWB communications), and a link quality characteristic.

The locator 210 is described herein in conjunction with one or more inputs 216. The one or more inputs 216 may include one or more outputs 218 from another locator 210. For example, a first locator 210 may be influenced by a second locator 210 via one or more inputs 216 received from the second locator 210. As described herein, the first locator 210 may dynamically adjust based on operation of the second locator 210. The first locator 210 may receive one or more inputs 216 from the second locator 210 and may dynamically adjust based on operation of the second locator 210. For instance, the first locator 210 may offset a value of a given signal characteristic via calibration data (e.g., adjust RSSI by +4 or −4) based on operation of the second locator 210, or may receive inputs 216 from the second locator 210, or both.

In one embodiment, first and second locators 210 may be utilized to generate one or more outputs 218 respectively from each of the first and second locator 210. The one or more outputs 218 from each of the first and second locators 210 may be aggregated or combined (e.g. via a function or heuristic) to yield a location. In this way, the first and second locators 210 may be utilized in parallel to enhance locator performance.

The first locator and the second locator 210 may be based on the same or different types of inputs 16. For example, the second locator 210 may utilize inputs based on one or more of RSSI, AOA (e.g., UWB AOA or BLE CS/HADM AOA), phase-based distance, TOF, and BLE channel sounding (e.g., high accuracy distance measurement [HADM]). And, the first locator 210 may utilize inputs based on UWB. Alternatively, the first locator 210 may utilize inputs based on RSSI, and the second locator 210 may utilize inputs based on UWB and/or HADM. The system 100 may calibrate a UWB-based locator based on communications according to BLE CS/HADM, or the system may calibrate a BLE CS/HADM-based locator based on communications according to UWB. In one embodiment, the second locator 210 may be based on inputs relating to BLE CS/HADM with RSSI (where it does both RSSI and CS) and the first locator 210 may be based on inputs relating to UWB.

In one embodiment, BLE CS/HADM may be based on one or more of phase-based ranging, round-trip timing (TOF), and related security aspects. It is noted that channel sounding (CS) may be described in conjunction with HADM, which is the precursor naming convention for CS in the BLE realm. Channel sounding or CS, also described as HADM, may be based on a tone exchange between an initiator device, device A, and a reflector device, device B. The tone exchange may involve device A transmitting an initiator signal according to a frequency, device B receiving the initiator signal, device B transmitting a reflector signal based on the initiator signal according to the same frequency, and device A receiving the reflector signal. Based on a phase characteristic of the initiator signal and/or the reflector signal measured respectively by the device B or device A, a phase rotation of the initiator signal and/or the reflector signal may be determined, enabling a distance determination with respect to device A and B. In the illustrated embodiment of FIG. 5, the system 100 is provided in conjunction with an object 10 that is a vehicle. The object 10 may be different in other applications. The system 100 in the illustrated embodiment includes an object device 50 and a plurality of remote devices 40A-D disposed in a fixed position on the object 10, such that these devices comprise fixed position devices. The locations of the remote devices 40A-D and the object device 50 may vary from application to application; however, for purposes of disclosure the object device 50 is disposed generally in a center of the vehicle cabin and the remote devices 40A-D are disposed at the four corners of the vehicle. A grid is shown in the illustrated embodiment to facilitate discussion in conjunction with the locator 210.

Figure 9:
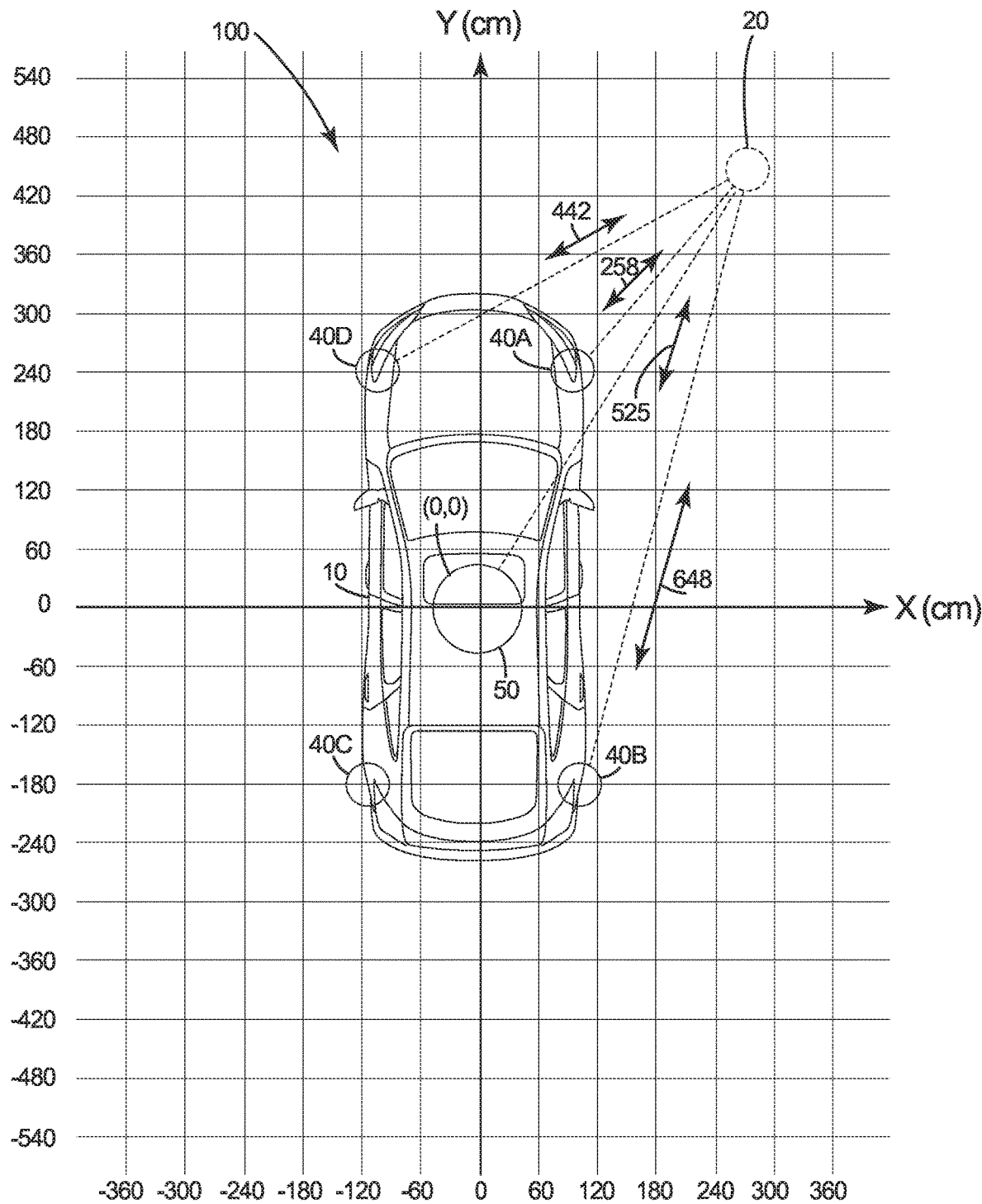
FIG. 9 shows a representative view of a system in accordance with one embodiment.

In the illustrated embodiment of FIG. 9, the portable device 20 is disposed at X, Y coordinates 270 cm, 450 cm relative to the origin (0 cm, 0 cm) provided at the center of the object 10. The remote devices 40A, 40B, 40D are respectively positioned at 258 cm, 648 cm, and 442 cm relative to the portable device 20. In one embodiment, a signal characteristic of communications (e.g., RSSI) transmitted from the portable device 20 and received by each of the remote devices 40A, 40B, 40D and the object device 50 may be translated by the locator 210 to a distance or location relative to each respective remote device 40A, 40B, 40D. (Remote device 40C is shown and left out of this determination in the illustrated embodiment because a portion of the vehicle obstructs the line of sight between the portable device 20 and the remote device 40C, potentially preventing a valid measurement of a signal characteristic of communications.)

The portable device 20 is disposed at X, Y coordinates 280 cm, 460 cm relative to the origin (0 cm, 0 cm). The remote devices 40A, 40B, 40D are respectively positioned at 216 cm, 569 cm, and 437 cm relative to the portable device 20. A signal characteristic of communications transmitted from the portable device 20 and received by each of the remote devices 40A, 40B, 40D and the object device 50 may be translated by the locator 210 to a distance or location of the portable device 20 relative to the object 10. In one embodiment, based on a distance determination with respect to each of the remote devices 40A, 40B, 40D and the object device 50, and known locations of the remote devices 40A, 40B, 40D and the object device 50, the locator 210 may determine a location of the portable device 20 relative to the object 10.

The locator 210 in one embodiment may translate the signal characteristic obtained from a remote device 40 or the object device 50 to a distance metric or other parameter in a variety of ways, including, for instance, a translation table for each fixed position device or type of fixed position devices, fingerprinting or other heuristic (e.g., a machine learned translator). The locator 210 in one embodiment may determine a location based on a machine learning algorithm, which may be trained based on truth information obtained during a training and validation process.

Figures 6, 7:
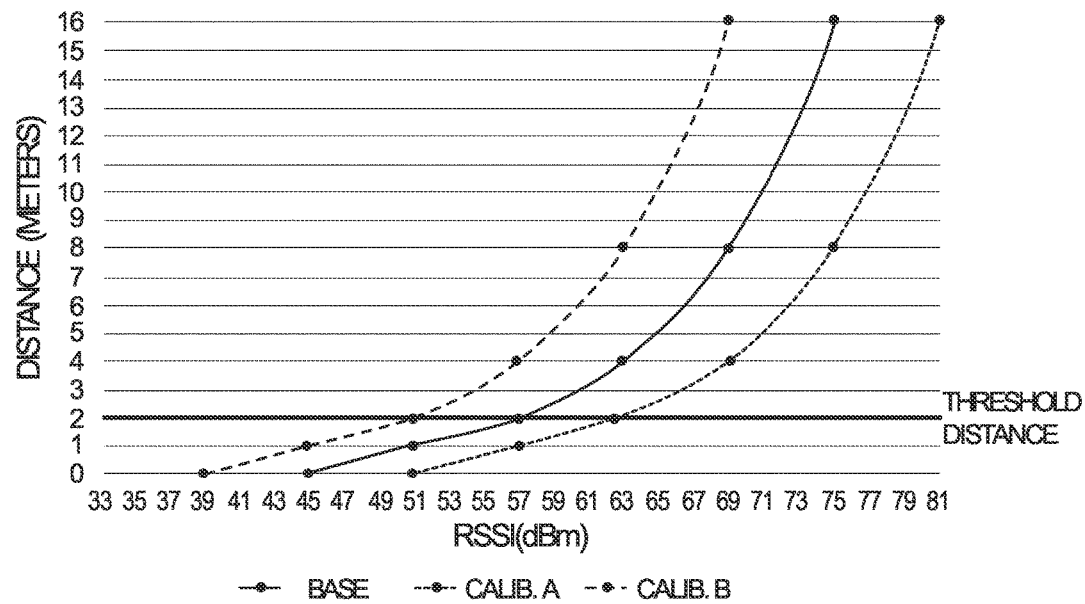
FIG. 6 depicts a translation table in accordance with one embodiment.
FIG. 7 depicts a translation chart in accordance with one embodiment.

An example of a translation table is shown in chart form in the illustrated embodiment of FIG. 6 and generally designated 600. The translation table 600 may be operable to translate RSSI to a distance for each of the remote devices 40A, 40B, 40D in accordance with a baseline configuration, which, in one embodiment, may not be calibrated to a particular type of portable device 20 or environment, or both.

Figure 5:
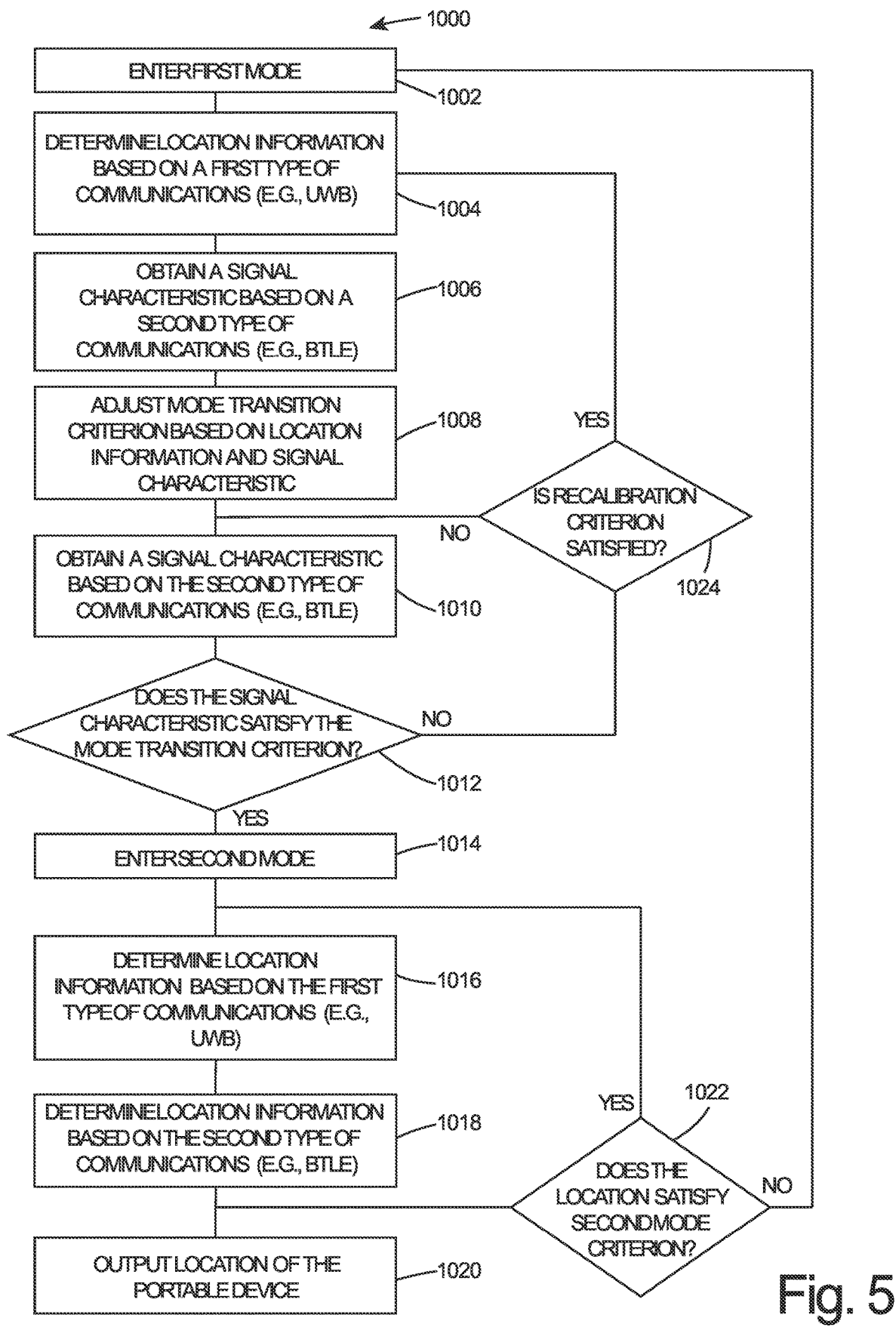
FIG. 5 shows a method in accordance with one embodiment.

Returning to the illustrated embodiment of FIG. 5, measurements of RSSI for the remote devices 40A, 40B, 40D correspond generally and respectively to −47 dBm, −53 dBm, and −55 dBm. These RSSI measurements for each remote device 40A, 40B, 40D may be translated directly to distance measurements based on the translation table 600; alternatively, the locator 210 may utilize the RSSI measurement to represent distance in further calculations to determine the position of the portable device 20 relative to the object 10.

In the illustrated embodiment, with the three distances determined relative to each of the remote devices 40A, 40B, 40D based on the translation table 600, the locator 210 may determine a location of the portable device 20 by trilateration of the three distances given known positions of the remote devices 40A, 40B, 40D. It should be noted that the present disclosure is not limited to trilateration as part of the locator algorithm 212; a variety of additional or alternative functions may form part of the locator algorithm 212, as discussed herein, including a distance function, a triangulation function, a lateration function, a multi-lateration function, a fingerprinting function, a differential function, a time of flight function, a time of arrival function, a time difference of arrival function, an angle of departure function, a geometric function, etc., or any combination thereof.

The locator algorithm 212 of the locator 210 may be tunable according to a plurality of parameters 214 of the locator 210. Example parameters include the following: sensor offsets (e.g., RSSI or AOA offsets, or both), zone offsets (e.g., thresholds and hysteresis parameters), and distance conversion (e.g., constants or equations, or both).

Based on the one or more inputs 216 and the values of the plurality of parameters 214, the locator algorithm 212 may provide an output 218 indicative of a location of the portable device 20 relative to the object 10. The locator algorithm 212 may vary from application to application. In one embodiment, presence and location of the portable device 20 may be determined as a basis for authorizing one or more object commands. Examples of such a configuration are described in U.S. patent application Ser. No. 16/713,358, entitled A SYSTEM AND METHOD OF DETERMINING REAL-TIME LOCATION, filed Dec. 13, 2019, to Smith et al.—the disclosure of which is hereby incorporated by reference in its entirety.

III. Method of Operation

A method of determining a location of a portable device 20 in accordance with one embodiment is shown in FIG. 5 and generally designated 1000. The method 1000 may include initiating operation in a first mode in which location information based on a first type of communications is used as a basis for calibrating output from a second type of communications to determine whether to transition to a second mode. The calibration may take the form of adapting a mode transition criterion relative to the output from the second type of communications to determine whether to transition to the second mode in which the first type of communications is used as a primary basis for determining location.

The method 1000 in the illustrated embodiment may involve determining location information based on a first type of communications with the portable device 20. The first type of communications may be UWB communications, which can enable determination of a signal characteristic, such as a TOF characteristic, that is a more accurate indicator of location than a signal strength characteristic of BTLE communications. Step 1002. The method may also involve obtaining a signal characteristic based on the second type of communications, which may be BTLE communications. Step 1006. Based on establishment of a first connection, the system 100 may begin using the first locator (e.g., the system 100 may not be aware of the reliability of the second locator). The system may or may not use data previously determined (stored in ROM) from a prior connection session. If prior use data is utilized, after the prior use data is obtained, depending upon a determined mode, the system may return to a first mode until a trigger occurs to transition to another mode. For instance, in a BTLE RSSI+UWB system, the system may establish a connection to do both BTLE RSSI+UWB ranging, and then if the portable device 20 moves outside of UWB range, the system 100 may calibrate BTLE RSSI and transition back to BLE RSSI ranging only mode.

The location information obtained based on the first type of communications may be processed in conjunction with the signal characteristic (e.g., RSSI) based on the second type of communications to determine an adjustment to a mode transition criterion. Step 1006. Although described in conjunction with one mode transition criterion, it is to be understood that the present disclosure is not so limited and that multiple mode transition criterions may be used, some or all of which may be dynamic or adjustable.

In the illustrated embodiment of FIG. 6, the translation table 600 may form a baseline translation between RSSI and distance, with measured RSSI being the signal characteristic obtained based on the second type of communications. The computed distance and the measured RSSI are shown as calibration measurement 620 within a potential table 610 of such calibration measurements (shown greyed out to clarify that obtaining a plurality of calibration measurements, although possible and potentially useful, may not be conducted in accordance with one embodiment of the present disclosure.) A comparison between the translation table 600 and the calibration measurement 620 may facilitate an adjustment to a mode transition criterion, shown as a dynamic criterion 630 in the illustrated embodiment as Measured RSSI−Variable Offset<Threshold Base RSSI, wherein the Threshold Base RSSI corresponds to a threshold distance 640 associated with transitioning to a second mode. In the illustrated embodiment, the Baseline RSSI for a distance corresponding to the computed distance may be compared against the Measured RSSI to yield a variable offset value for the calibration measurement 620. This variable offset value may facilitate calibrating the future RSSI measurements. Applying the offset to future RSSI measurements may yield a relationship between RSSI and distance shown with two different example offsets in FIG. 7.

After the mode transition criterion has been adapted, the signal characteristic based on the second type of communication may be obtained again, this time without calibrating the signal characteristic against location information obtained based on the first type of communications. Step 1010. This signal characteristic may be processed to determine the signal characteristic satisfies the mode transition criterion. The mode transition criterion, in one embodiment, may be associated with a determination of whether the portable device 20 is within a threshold distance 640 with respect to the object 10. If the portable device 20 is determined to be within the threshold distance 640, the system 100 may transition to determining location based on the first type of communications. Steps 1012, 1014. For instance, in the case of BTLE communications being the second type of communications and UWB communications being the first type of communications, location information based on UWB communications may be more accurate, but incapable of being updated as often as and/or with as little power as location information based on BTLE communications. As a result, determining location information based on BTLE communications, dynamically calibrated by location information based on UWB communications, may enable determining location of the portable device 20 outside the threshold distance 640.

As described herein, the system 100 may utilize one or more types of algorithms to determine a threshold (e.g., heuristics or a full localization algorithm to determine a zone), and a machine learning model may be used to apply an offset to individual readings based on calibration data, instead of a less complex formula.

If the system 100 determines that the signal characteristic based on the second type of communication does not satisfy the mode transition criterion, the system 100 may determine if recalibration is appropriate, and if not, obtain another signal characteristic based on the second type of communication. Steps 1024, 1010. The criterion of whether recalibration is appropriate can vary from application to application. In one embodiment, the criterion may be an amount of time since the last time the mode transition criterion was varied. Additionally or alternatively, the criterion may correspond to whether the portable device 20 has moved outside a range and returned to within the range.

In the second mode of operation, the system 100 may obtain location information based on the first type of communication (e.g., UWB communications). Steps 1014, 1016. Optionally, the system 100 may also obtain location information based on the second type of communication (e.g., BTLE communications). Step 1018.

Based on the location information obtained from Step 1016, a location may be output for further processing by the system 100. Step 1020. The location may also be compared against a second mode criterions (such as the location being within the threshold distance 640), and if the second mode criterion is satisfied, Step 1016 may be repeated. If the second mode criterion is not satisfied, the system 100 may return to the first mode of operation. Step 1022.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A system for establishing a location with respect to a portable device and an object, the system comprising:
   a plurality of antennas, each of the plurality of antennas configured to receive wireless communications and provide one or more antenna outputs corresponding to wireless communications;
   a controller capable of directing communications between a fixed position device and the portable device, the controller operable to direct communications according to a first mode based on a previously established connection between the fixed position device and the portable device, the controller operable to direct a locator to determine the location of the portable device with respect to the object based on the one or more antenna outputs for the communications according to the first mode; and wherein the controller is configured, in response to the determined location being indicative of the portable device being greater than a threshold range, to direct communications according to a second mode, the controller operable to direct the locator to determine the location of the portable device with respect to the object based on the one or more antenna outputs for the communications according to the second mode, the controller operable to direct the locator to calibrate for determining the location in the second mode based on the one or more antenna outputs for communications according to the first mode.

2. The system of claim 1, wherein the controller directs communications according to the first mode to include both UWB and BLE communications.

3. The system of claim 1, wherein the controller directs communications according to the second mode to include only BLE communications.

4. The system of claim 1, wherein:
the controller is configured to determine calibration data based on wireless communications with the portable device in accordance with the first mode of communications;
the controller is configured to vary the threshold range based on a comparison between the one or more antenna outputs and the calibration data.

5. The system of claim 4, wherein first location information is determined by the locator based on communications according to the first mode, and wherein second location information is determined by the locator based on communications according to the second mode as calibrated based on communications according to the first mode.

6. The system of claim 5, wherein the threshold is varied based on a comparison of the first location information and the second location information.

7. The system of claim 1, wherein communications according to the first mode include communications according to first and second communication protocols, and wherein communications according to the second mode include communications only according to the second communication protocol.

8. The system of claim 7, wherein the controller is configured to determine if the portable device is located greater than the threshold range relative to the object based on wireless communications with the portable device in accordance with the second communication protocol.

9. The system of claim 8, wherein the first communication protocol is ultra-wide band or BLE CS/HADM, and the second communication protocol is Bluetooth Low Energy.

10. A method of determining a location of a portable device with respect to an object, said method comprising:
retrieving from memory connection information for communications with the portable device according to a first mode;
establishing communications with the portable device according to the first mode and based on the connection information retrieved from memory;
determining first location information about the portable device relative to the object based on communications according to the first mode;
transitioning to communications with the portable device according to a second mode based on the first location information being indicative of the portable device being greater than a threshold range relative to the object;
calibrating, based on communications according to the first mode, for determining second location information about the portable device relative to the object; and
determining second location information about the portable device relative to the object based on communications according to the second mode.

11. The method of claim 10, wherein communications according to the first mode include both UWB and BLE communications.

12. The method of claim 10, wherein communications according to the second mode including only BLE communications.

13. The method of claim 10, comprising varying the threshold based on a comparison between the first location information and the second location information.

14. The method of claim 10, wherein establishing communications with the portable device according to the first mode includes communicating with the portable device according to first and second communication protocols.

15. The method of claim 14, wherein communicating with the portable device according to the second mode includes communicating with the portable device only according to the second communication protocol.

16. The method of claim 14, wherein the first communication protocol is ultra-wide band or BLE CS/HADM, and the second communication protocol is Bluetooth Low Energy.

17. A system for determining a location of a portable device with respect to an object, said system comprising:
a plurality of antennas, each of the plurality of antennas configured to receive wireless communications and provide one or more antenna outputs corresponding to wireless communications;
a control system operable to establish communications with the portable device according to a first mode based on a previously established connection with the portable device, the control system configured to obtain a first signal characteristic for the communications according to the first mode based on the one or more antenna outputs of a first antenna of the plurality and to obtain a second signal characteristic for the communications according to the first mode based on the one or more antenna outputs of a second antenna of the plurality;
the control system configured to determine first location information about the portable device relative to the object based on the first and second signal characteristics for the communications with the portable device according to the first mode;
the control system configured to transition from communications according to the first mode to communications with the portable device according to a second mode based on the first location information being indicative of the portable device being greater than a threshold range relative to the object, the control system configured for the second mode to obtain the second signal characteristic for the communications based on the one or more antenna outputs of the second antenna of the plurality; and
the control system operable to determine second location information about the portable device relative to the object based on the second signal characteristic for the communications with the portable device according to the second mode, the control system configured to calibrate for determining the second location information based on the first and second signal characteristics for the communications with the portable device according to the first mode.

18. The system of claim 17, wherein the controller directs communications according to the first mode to include both UWB and BLE communications, and the controller directs communications according to the second mode to include only BLE communications.

19. The system of claim 17, wherein the threshold is varied based on a comparison of the first location information and the second location information.

20. The system of claim 17, wherein the control system is configured to calibrate for determining the second location information based on the communications according to the second mode, based on a comparison of the first and second signal characteristics for the communications with the portable device according to the second mode.

* * * * *